(12) United States Patent
Mogi et al.

(10) Patent No.: US 10,205,506 B2
(45) Date of Patent: Feb. 12, 2019

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventors: Atsufumi Mogi, Kawasaki (JP); Hitoshi Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 15/265,299

(22) Filed: Sep. 14, 2016

(65) Prior Publication Data

US 2017/0093479 A1    Mar. 30, 2017

(30) Foreign Application Priority Data

Sep. 24, 2015 (JP) ................. 2015-187447

(51) Int. Cl.
| | |
|---|---|
| H04L 12/28 | (2006.01) |
| H04B 7/155 | (2006.01) |
| H04W 8/00 | (2009.01) |
| H04W 48/16 | (2009.01) |
| H04W 4/00 | (2018.01) |
| H04W 52/02 | (2009.01) |
| H04L 29/08 | (2006.01) |
| H04W 84/12 | (2009.01) |
| H04W 88/18 | (2009.01) |

(52) U.S. Cl.
CPC ......... *H04B 7/155* (2013.01); *H04L 67/2814* (2013.01); *H04L 67/325* (2013.01); *H04W 4/00* (2013.01); *H04W 8/005* (2013.01); *H04W 48/16* (2013.01); *H04W 52/0216* (2013.01); *H04W 8/00* (2013.01); *H04W 84/12* (2013.01); *H04W 88/182* (2013.01); *Y02D 70/00* (2018.01); *Y02D 70/142* (2018.01)

(58) Field of Classification Search
CPC ....................................................... H04J 12/56
USPC ........................................................ 370/329
See application file for complete search history.

(56) References Cited

U.S. PATENT DOCUMENTS

| | | |
|---|---|---|
| 2014/0254569 A1 | 9/2014 | Abraham et al. |
| 2014/0269555 A1 | 9/2014 | Sadasivam et al. |
| (Continued) | | |

FOREIGN PATENT DOCUMENTS

| | | |
|---|---|---|
| JP | 2008-518555 A | 5/2008 |
| JP | 2010-062846 A | 3/2010 |
| (Continued) | | |

OTHER PUBLICATIONS

European Search Report issued in corresponding application No. 16001819.8 dated Nov. 7, 2016.

*Primary Examiner* — Dang Ton
(74) *Attorney, Agent, or Firm* — Carter, DeLuca, Farrell & Schmidt LLP

(57) ABSTRACT

A communication apparatus searches for other communication apparatuses each of which can execute, as a proxy of the communication apparatus, at least one of transmission processing and reception processing of a wireless signal during a period of a predetermined length which comes at a predetermined time interval, and selects, from the other communication apparatuses detected by the search, an apparatus for executing the processing as the proxy of the communication apparatus.

13 Claims, 13 Drawing Sheets

(56) References Cited

U.S. PATENT DOCUMENTS

| | | | |
|---|---|---|---|
| 2014/0286644 A1* | 9/2014 | Oshima | H04B 10/11 398/118 |
| 2014/0302787 A1 | 10/2014 | Rantala et al. | |
| 2014/0313966 A1 | 10/2014 | Shukla et al. | |
| 2015/0245317 A1 | 8/2015 | Aoki | |
| 2015/0245399 A1 | 8/2015 | Aoki | |
| 2015/0245400 A1 | 8/2015 | Aoki | |
| 2016/0278082 A1 | 9/2016 | Aoki | |
| 2017/0094497 A1 | 3/2017 | Aoki et al. | |

FOREIGN PATENT DOCUMENTS

| | | | |
|---|---|---|---|
| JP | 5353683 B2 | 11/2013 |
| WO | 2006/049724 A1 | 5/2006 |

* cited by examiner

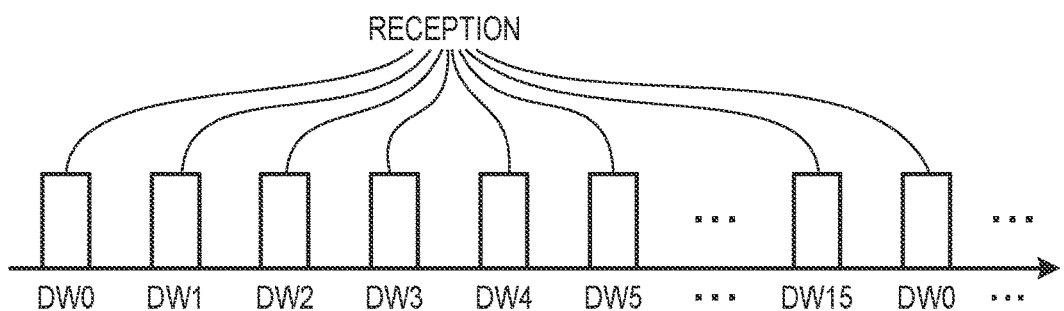
FIG. 4A
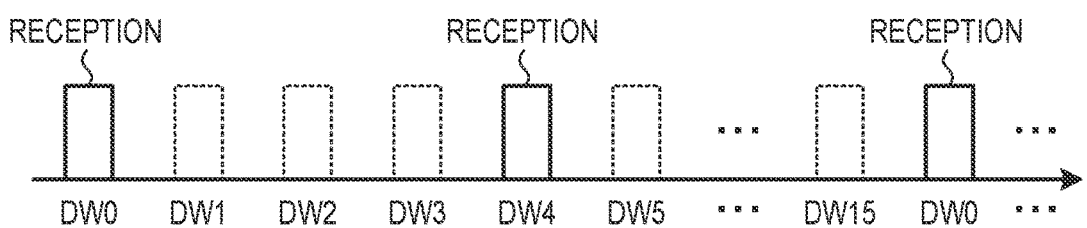
FIG. 4B
FIG. 5
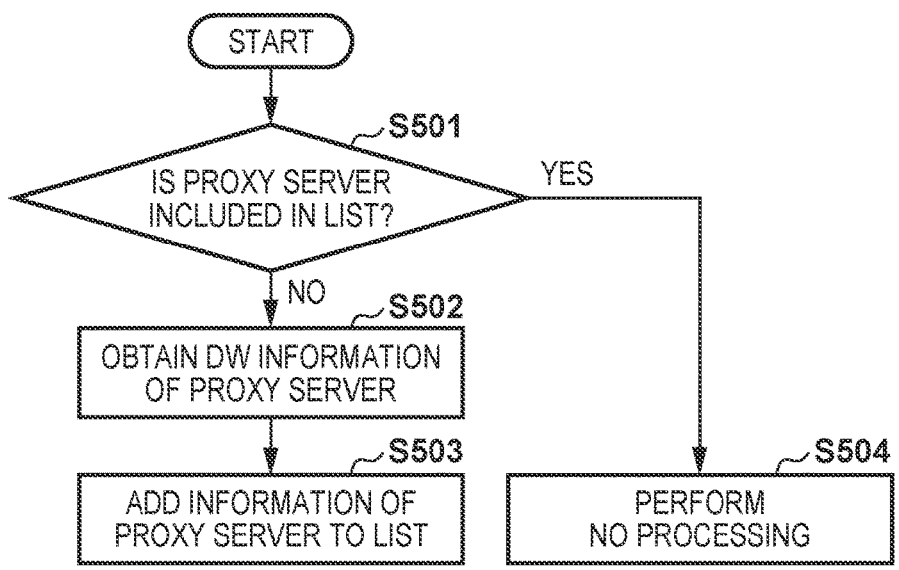

COMMUNICATION APPARATUS, CONTROL METHOD, AND COMPUTER-READABLE STORAGE MEDIUM

BACKGROUND OF THE INVENTION

Field of the Invention

The present invention relates to a technique of recognizing another communication apparatus in a communication apparatus.

Description of the Related Art

In recent years, a wireless LAN represented by the IEEE802.11 standard series has been widely used. In the wireless LAN, a base station called an access point (AP) often controls a network. A wireless network is formed by the AP and stations (STAs) which fall within the radio wave coverage of the AP and are in a wirelessly connected state.

Furthermore, products and standards for various network forms of the wireless LAN have appeared on the market, in addition to this conventional simple wireless network configuration of the AP and STAs. U.S. Patent Application Publication No. 2014/0302787 describes NAN (Neighbor Awareness Networking) which is defined by Wi-Fi Alliance as a standard for detecting a communication apparatus and a service provided by it with low power consumption. This is intended to reduce the power consumption when a communication apparatus synchronizes with another communication apparatus in terms of a period during which information is exchanged with the other communication apparatus, and thus shortens the time during which a wireless RF (Radio Frequency) part is enabled. This synchronization period in NAN is called a DW (Discovery Window). A set of NAN devices which share a predetermined synchronization period is called a NAN cluster. Among the NAN devices, terminals respectively having a master role or a non-master sync role transmit sync beacons as signals for ensuring the synchronization between the terminals during the DW period. The NAN device establishes synchronization with another terminal, and then transmits/receives a subscribe message as a signal for detecting a service, a publish message as a signal for sending a notification of provision of a service, and the like during the DW period. Furthermore, the NAN device can transmit/receive a follow-up message for exchanging additional information about a service during the DW period. On the other hand, the NAN device can enter a DOZE state as a state in which no wireless signal is received during the DW period, thereby reducing the power consumption.

The appearance frequency of DW periods during which a NAN device receives wireless signals depends on the NAN device but all NAN devices joining a NAN cluster need to receive wireless signals during a special DW period called DW0. DW0 indicates a DW period which comes once every 16 DW periods. Furthermore, DW0 indicates a DW period which starts when the lower 23 bits of a TSF (Time Synchronization Function) as a counter timer used by the NAN cluster for synchronization are 0x0. The NAN devices respectively operating in a master role or a non-master sync role need to transmit sync beacons for every DW period, and can thus receive wireless signals during all the DW periods.

If a NAN device is in the DOZE state during a DW period, it cannot transmit/receive a subscribe message and publish message during that period. This poses a problem that a period until another apparatus detects a service provided by a NAN device which often enters the DOZE state during DW periods is prolonged.

The present invention provides a technique for shortening a period until a communication apparatus detects another apparatus and a service provided by it.

SUMMARY OF THE INVENTION

According to one aspect of the present invention, there is provided a communication apparatus comprising: a search unit configured to search for other communication apparatuses each of which can execute, as a proxy of the communication apparatus, at least one of transmission processing and reception processing of a wireless signal during a period of a predetermined length which comes at a predetermined time interval; and a selection unit configured to select, from the other communication apparatuses detected by the search of the search unit, an apparatus for executing the processing as the proxy of the communication apparatus.

According to another aspect of the present invention, there is provided a communication apparatus comprising: a detection unit configured to detect another communication apparatus which can proxy-transmit service information during discovery windows of Neighbor Awareness Networking; and a determination unit configured to determine, in accordance with a frequency at which the other communication apparatus detected by the detection unit is set in a state of performing no wireless communication during the discovery windows, whether to request the other communication apparatus to proxy-transmit the service information of the communication apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B are timing charts each showing the relationship between DW periods and signal transmission/reception timings;

FIG. 5 is a flowchart illustrating the first example of proxy server search processing;

DESCRIPTION OF THE EMBODIMENTS

Figure 1:
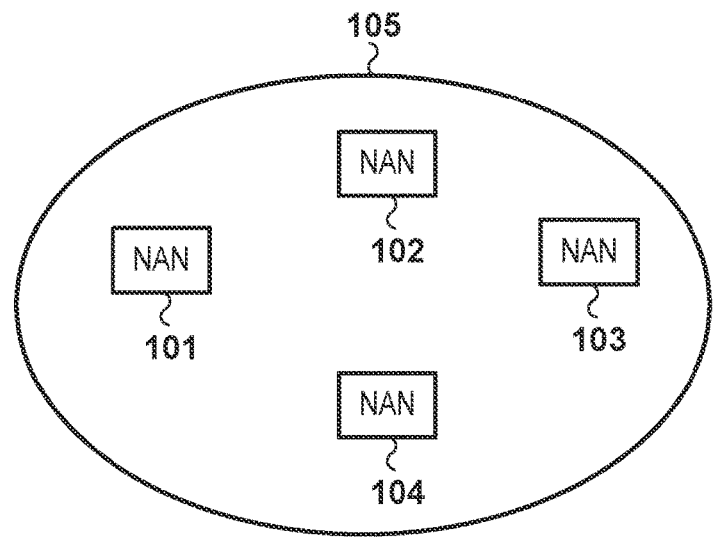
FIG. 1 is a view showing an example of the configuration of a wireless communication system.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

The following description assumes that each communication apparatus is a terminal having the wireless LAN communication function complying with the IEEE802.11 standard series. The present invention, however, is not limited to this. Furthermore, although each communication apparatus to be described below is a NAN device capable of discovering, by Wi-Fi Alliance Neighbor Awareness Networking (NAN), another communication apparatus and a service provided by it, the present invention is not limited to this. That is, in the following description, technical terms corresponding to a predetermined standard are used. However, each discussion to be described below is applicable to other standards of the same type.

In NAN, service information is communicated during a period called a discovery window (DW). The DW indicates the convergence time and channel of a plurality of devices for executing NAN. A set of terminals which share the schedule of DWs is called a NAN cluster. Note that the DW is set in every predetermined cycle.

Each terminal belonging to the NAN cluster operates in one of master, non-master sync, and non-master non-sync roles. The terminal operating in the master role transmits a synchronization beacon (sync beacon) as a beacon for causing each terminal to identify the DW and synchronize with it. In addition, the terminal operating in the master role transmits a discovery beacon as a signal for causing a terminal, which does not belong to the NAN cluster, to recognize the NAN cluster. The discovery beacon is transmitted during a period other than the DW periods for, for example, every 100 TUs (Time Units) (1 TU corresponds to 1,024 μsec). Note that at least one terminal in each NAN cluster operates in the master role.

The terminal operating in the non-master sync role transmits not a discovery beacon but a sync beacon. The terminal operating in the non-master non-sync role transmits neither a sync beacon nor a discovery beacon.

In accordance with the sync beacon, the terminal joining the NAN cluster communicates service information during the DW period in synchronous with the DW period set in every predetermined cycle.

The terminals communicate, with each other, a subscribe signal as a signal for detecting or requesting a service and a publish signal as a signal for sending a notification of provision of a service during the DW period. Furthermore, the respective terminals can exchange follow-up signals for exchanging additional information about a service during the DW period. Note that the publish, subscribe, and follow-up signals will be collectively referred to as service discovery frames (SDFs) hereinafter. The respective terminals can advertise or detect the service by exchanging the SDFs.

Each terminal joining the same NAN cluster performs communication using channel 6 (2.437 GHz) in a frequency band of 2.4 GHz. In the NAN cluster, a DW of 16 TUs is set every 512 TUs. That is, in the NAN cluster, a DW of 16 TUs is repeatedly set every 512 TUs. The respective terminals joining the NAN cluster synchronize the schedules of DWs by sync beacons transmitted/received during the DWs. Each terminal belonging to the NAN cluster communicates service information using the SDFs during each DW period.

As described above, the NAN device can suppress the power consumption even during the DW period by entering the DOZE state as a state in which no wireless signal is transmitted/received. On the other hand, the NAN device cannot transmit/receive the subscribe and publish messages during the DW period when it is in the DOZE state. This may prolong the period until the NAN device discovers a service.

To cope with this, some NAN devices can request another NAN device to perform service search and notification processes such as subscribe and publish processes. A NAN device which proxy-executes the service search and notification processes of another NAN device will be referred to as a proxy server hereinafter. A NAN device which requests another NAN device to serve as a proxy will be referred to as a proxy client hereinafter. If the proxy client requests the proxy server to proxy-transmit service information, the proxy server proxy-transmits the service information of the proxy client. When the proxy server executes service search and notification processes instead of the proxy client, the proxy client can significantly reduce the power consumption by entering the DOZE state during a longer period. Even if a NAN device which is searching for a service provided by the proxy client transmits a subscribe message while the proxy client is in the DOZE state, the proxy server may return a response. This increases the probability that the NAN device which is searching for the service can detect the service provided by the proxy client even if the proxy client is in the DOZE state.

Therefore, in this embodiment, a NAN device searches for other nearby NAN devices each of which can operate as a proxy server, and selects, from the discovered devices, a device of which proxy processing is to be requested. The NAN device then requests the selected device to execute the proxy processing. This can suppress the power consumption of the NAN device.

On the other hand, if the proxy client requests proxy-execution of service search and notification processes but the proxy server which has received the request often enters the DOZE state, the period during which the proxy server proxy-executes the service search and notification processes of the proxy client is unwantedly shortened. As a result, the time until another NAN device discovers a service provided by the proxy client may be prolonged. Furthermore, if the proxy client is an apparatus on the service search side, the time until a search target service is discovered may be prolonged.

To cope with this, in this embodiment, the NAN device selects, as a proxy server for proxy-transmitting/receiving a predetermined wireless signal instead of itself, a proxy server which can shorten the time until a service is discovered. That is, the NAN device performs control to select, as a proxy server for proxy-transmitting/receiving a predetermined wireless signal instead of itself, a proxy server which does not often shift to the DOZE state. After a description of the configuration of a wireless communication system and the arrangement of a communication apparatus, which are common to the respective embodiments, a processing procedure according to each embodiment will be described.

(Configuration of Wireless Communication System)

An example of the configuration of a wireless communication system according to this embodiment will be described with reference to FIG. 1. The wireless communication system according to this embodiment is formed by including NANs 101 to 104 as communication apparatuses (NAN devices) each complying with the NAN standard, and the NANs 101 to 104 join a NAN cluster 105. The NAN devices (NANs 101 to 104) joining the NAN cluster 105 creates a network using frequency channel 6 (6 ch). The NAN cluster 105 is a NAN cluster in which the length of each DW period is 16 TUs, and the time interval from the start timing of a DW period to that of the next DW period is 512 TUs. The DW periods have a cycle of 16 DW periods of DW0 to DW15. A DW period 16 DW periods after DWn (n is an integer of 0 to 15) is also DWn. Assume that all the NAN devices joining the NAN cluster 105 respectively receive wireless signals during DW0 without exception.

The NAN 101 is a communication apparatus capable of executing each process to be described below. Based on the NAN standard, the NAN 101 can discover nearby communication apparatuses and services provided by them, and provide information of a service which can be provided by itself. The NAN 101 can operate as a proxy client which can search for proxy servers, select one of the proxy servers discovered by the search, and request proxy transmission/reception of a wireless signal. Note that the proxy server is a NAN device which can proxy-execute service search and notification processes of another NAN device. Assume that the NAN 101 joins the NAN cluster 105 in the non-master non-sync role. In an example, the NAN 101 has a state in which it receives wireless signals during DW0, DW4, DW8, and DW12 and a state in which it receives wireless signals during all the DW periods. Note that DWn (n=0, . . . , 15) represents a DW period which starts when a period of 512×n [TUs] elapses after the start of DW0 with reference to DW0. Furthermore, DW16 corresponds to next DW0. Note that the NAN 101 serves as the subscriber of a proxy service provided by each of the NANs 102 to 104.

The NAN 102 is a communication apparatus joining the NAN cluster 105 in the master role. The NAN 102 receives wireless signals during all the DW periods, and transmits sync beacons during all the DW periods. The NAN 102 transmits a discovery beacon in a cycle of 50 TUs (exclusive) to 200 TUs (exclusive). The NAN 102 serves as the publisher (proxy server) of a proxy service which the NAN 101 is searching for.

The NAN 103 is a communication apparatus joining the NAN cluster 105 in the non-master sync role. The NAN 103 can transmit/receive wireless signals during all the DW periods, and transmits sync beacons during all the DW periods. Assume that the NAN 103 serves as a publisher (proxy server) which provides a proxy service which the NAN 104 is searching for.

The NAN 104 is a communication apparatus joining the NAN cluster 105 in the master role. The NAN 104 can transmit/receive wireless signals during all the DW periods, and transmit sync beacons during all the DW periods. In addition, the NAN 104 transmits a discovery beacon in a cycle of 50 TUs (exclusive) to 200 TUs (exclusive). The NAN 104 serves as the publisher (proxy server) of the proxy service which the NAN 101 is searching for.

(Arrangement of NAN 101)

Figure 2:
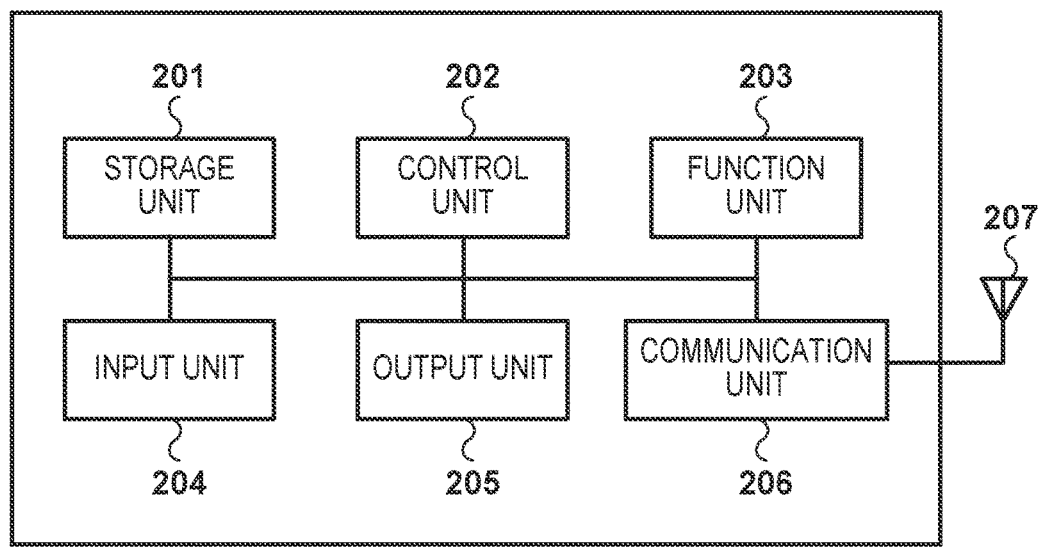
FIG. 2 is a block diagram showing an example of the hardware arrangement of a NAN 101.

FIG. 2 shows the hardware arrangement of the NAN 101 according to this embodiment. The NAN 101 includes, as an example of a hardware arrangement, a storage unit 201, a control unit 202, a function unit 203, an input unit 204, an output unit 205, a communication unit 206, and an antenna 207.

The storage unit 201 is formed by one or both of a ROM and a RAM, and stores programs for executing various operations (to be described later), and various kinds of information such as communication parameters for wireless communication. Note that instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 201.

A control unit 202 is formed by a CPU or MPU, and controls the overall NAN 101 by executing the programs stored in the storage unit 201. Note that the control unit 202 may control the overall NAN 101 in cooperation with an OS (Operating System) and the programs stored in the storage unit 201.

The control unit 202 controls the function unit 203 to execute predetermined processing such as image capturing, printing, and projection. The function unit 203 is hardware used by the NAN 101 to execute predetermined processing. If, for example, the NAN 101 is a camera, the function unit 203 serves as an image capturing unit, and performs image capturing processing. If, for example, the NAN 101 is a printer, the function unit 203 serves as a printing unit, and performs print processing. If, for example, the NAN 101 is a projector, the function unit 203 serves as a projection unit, and performs projection processing. Data processed by the function unit 203 may be data stored in the storage unit 201 or data communicated with another STA via the communication unit 206 (to be described later).

The input unit 204 accepts various operations from the user. The output unit 205 performs various kinds of output operations to the user. The output from the output unit 205 includes at least one of display on a screen, a voice output from a loudspeaker, a vibration output, and the like. Note that both of the input unit 204 and the output unit 205 may be implemented by one module like a touch panel.

The communication unit 206 controls wireless communication complying with the IEEE802.11 standard series, and controls IP communication. The communication unit 206 controls the antenna 207 to transmit/receive a wireless signal for wireless communication. The NAN 101 communicates a content such as image data, document data, or video data with another communication apparatus via the communication unit 206.

Figure 3:
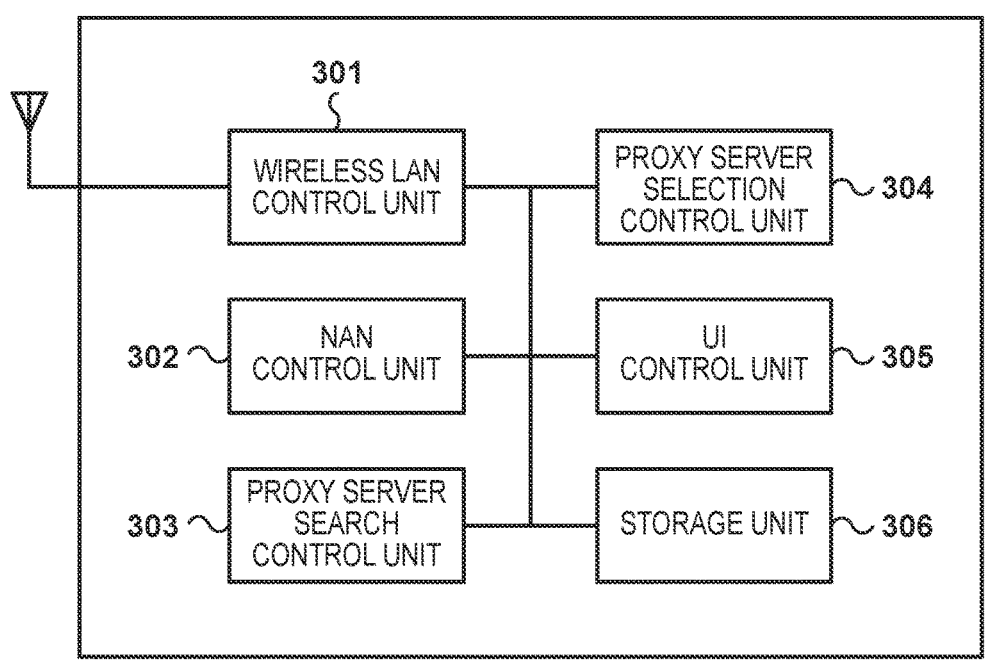
FIG. 3 is a block diagram showing an example of the functional arrangement of the NAN 101.

FIG. 3 is a block diagram showing an example of the functional arrangement of the NAN 101. The NAN 101 includes, as a functional arrangement, for example, a wireless LAN control unit 301, a NAN control unit 302, a proxy server search control unit 303, a proxy server selection control unit 304, a UI control unit 305, and a storage unit 306.

The wireless LAN control unit 301 is formed by including an antenna for transmitting/receiving a wireless signal to/from another wireless LAN apparatus, a circuit, and a program for controlling the antenna and circuit. The wireless LAN control unit 301 executes wireless LAN communication control in accordance with the IEEE802.11 standard series. The NAN control unit 302 is formed by including hardware and a program for performing control in accordance with the NAN standard.

As described above, in the example, the NAN 101 has the state in which it receives wireless signals during DW0, DW4, DW8, and DW12 and the state in which it receives wireless signals during all the DW periods. These states will be described with reference to FIGS. 4A and 4B. FIGS. 4A and 4B are timing charts, respectively, schematically showing the wireless signal reception states of the NAN 101. FIG. 4A shows a state in which wireless signals can be transmitted/received during all the DW periods. In this state, the NAN 101 causes the wireless LAN control unit 301 to enable the wireless transmission/reception circuit during all the DW periods (that is, DW0 to DW15), thereby performing at least one of transmission and reception of wireless signals. On the other hand, FIG. 4B shows a state in which wireless signals can be transmitted/received during DWn (that is, during DW0, DW4, DW8, and DW12) where n is a multiple of 4. In this case, during the period of DWn where n is not a multiple of 4, such as DW1, DW2, or DW3, the NAN 101 disables the wireless transmission/reception circuit to transmit/receive no wireless signal. Thus, the NAN 101 can reduce the power consumption.

The proxy server search control unit 303 controls the NAN control unit 302 to control a search for a service provided by another NAN device. The proxy server selection control unit 304 controls selection of a proxy server of which proxy-execution of service notification processing is to be requested. Detailed processing of the proxy server search control unit 303 will be described later with reference to FIG. 5. Detailed processing of the proxy server selection control unit 304 will be described later with reference to FIG. 7. The UI control unit 305 is formed by including hardware related to a user interface such as a touch panel or button for accepting an operation for the NAN 101 by the user (not shown) of the NAN 101, and a program for controlling the hardware. Note that the UI control unit 305 also has, for example, a function for presenting information to the user, such as a function of displaying an image or the like or a function of outputting a voice. The storage unit 306 is a storage device which can be formed by a ROM, a RAM, and the like and saves data and programs operated by the NAN 101.

(Processing Procedure)

Some embodiments of a processing procedure executed by the NAN 101, a sequence in the wireless communication system, and the like will be described.

First Embodiment

In this embodiment, a NAN 101 selects, as a proxy server for executing proxy processing for the NAN 101, one of proxy servers existing nearby, which can receive signals during the DW periods at a high frequency. This increases the probability that the proxy server requested by the NAN 101 to execute the proxy processing can execute the proxy processing during the DW periods, thereby making it possible to shorten the time taken to perform service search/discovery processing. For example, as compared with a proxy server that is activated in a cycle of every four DW periods, the appearance frequency of the DW periods during which a proxy server that is activated in a cycle of every two DW periods can perform proxy response processing and the like is high. Thus, the NAN 101 selects the latter proxy server. The procedure of this processing will be described below.

First, an example of the procedure of processing of searching for proxy servers around the NAN 101, which is executed by a proxy server search control unit 303, will be described with reference to FIG. 5. This processing is processing when the NAN 101 searches for proxy servers as target candidates to be requested to operate as proxy servers. This processing can be executed at various timings, for example, upon power-on of the NAN 101, in a predetermined cycle, or by an explicit instruction of the user. In this processing, the proxy server search control unit 303 receives a proxy server publish message transmitted by a proxy server during DW0 as a DW period when all devices in a NAN cluster 105 are activated. The proxy server search control unit 303 confirms, using a list held in the NAN 101, whether the received proxy server publish message has been transmitted from a known proxy server (step S501). Note that the NAN 101 may identify an apparatus operable as a proxy server based on information contained in a beacon signal. In this case, an apparatus operable as a proxy server transmits a beacon containing information indicating that it can operate as a proxy server. If the proxy server as the transmission source is not included in the list (NO in step S501), the proxy server search control unit 303 obtains DW information from the received proxy server publish message (step S502). The proxy server search control unit 303 adds the information of the proxy server as the transmission source and the DW information to the above-described list (step S503). On the other hand, if the information of the proxy server as the transmission source of the proxy server publish message is stored in the list (YES in step S501), the proxy server search control unit 303 performs no processing any more (step S504).

Figure 6:
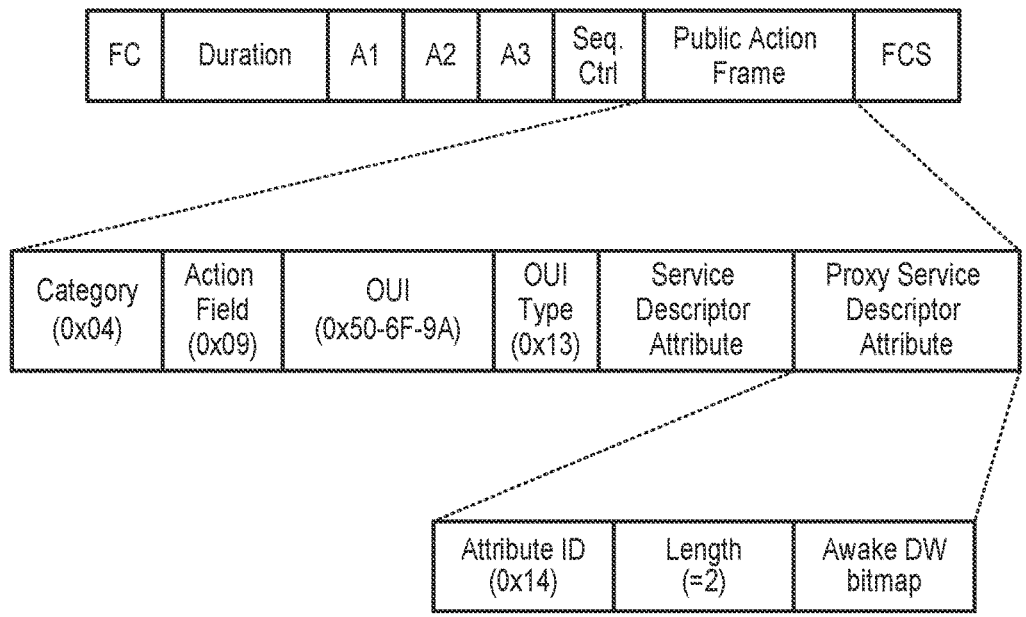
FIG. 6 is a view showing an example of the frame structure of a proxy server publish message.

FIG. 6 shows an example of the frame structure of the proxy server publish message. The proxy server publish message is a frame obtained by extending a NAN publish frame, and a frame added with information for sending a notification of provision of a proxy service. In a service descriptor attribute of public action attribute information elements, the same value as that of the NAN publish frame is set. A proxy service descriptor attribute (PSDA) as information for sending a notification of provision of a proxy service function is added as attribute information.

Upon receiving the publish frame including the PSDA, the NAN device identifies that the NAN device as the transmission source operates as a proxy server. In the PSDA, 14 as a value reserved in the NAN standard as an attribute ID is set. In a length, 2 is set. An awake DW bitmap is information for sending a notification, represented by bits, of DW periods during which the proxy server receives wireless signals, and stores a 2-byte bit map. If the "n"th bit of the awake DW bitmap is 1, this indicates that the transmission source apparatus of the proxy server publish frame receives a wireless signal during the period of DWn. If the "n"th bit of the awake DW bitmap is 0, this indicates that the transmission source apparatus of the proxy server publish frame receives no wireless signal during the period of DWn. For example, if the awake DW bitmap is 7, the lower 0th to 2nd bits are 1 and the remaining bits are 0, and thus wireless signals are received during periods of DW0 to DW2 and no wireless signals are received during periods of DW3 to DW15. By obtaining the information of the awake DW bitmap, the communication apparatus operating as a proxy client can know DWs during which the proxy server as the transmission source receives wireless signals.

Figure 7:
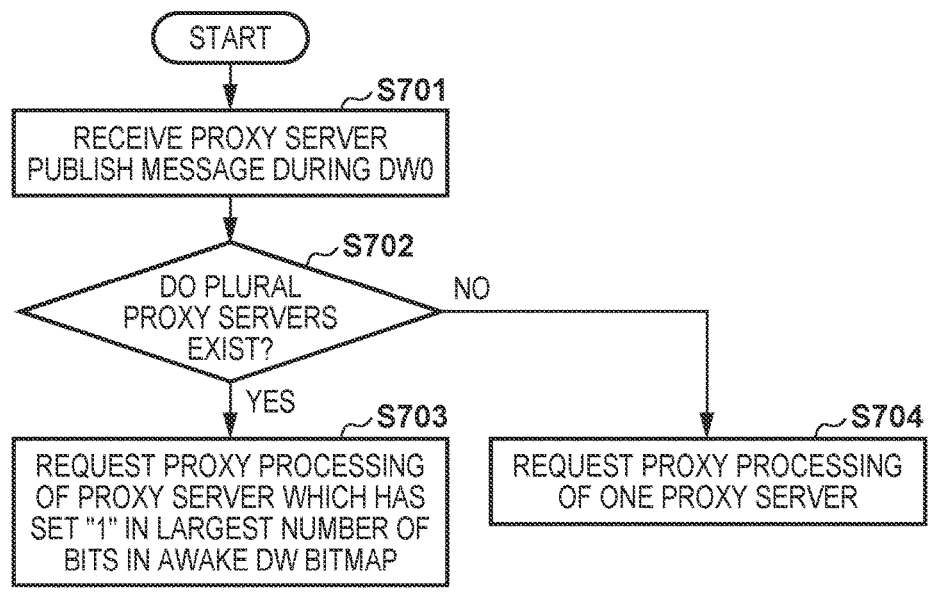
FIG. 7 is a flowchart illustrating the first example of proxy server selection processing.

Subsequently, processing of deciding a proxy server of which the NAN 101 is to request an operation as a proxy, which is executed by a proxy server selection control unit 304 of the NAN 101, will be described with reference to FIG. 7. This processing is executed when the NAN 101 decides to request the proxy server to proxy-execute service notification processing or service information collection processing in order to reduce the power consumption of itself. If, for example, the NAN 101 has detected no operation from the user for a given period or detects an explicit operation, by the user, of requesting the proxy processing of the proxy server, it performs the above-described request processing. Note that in other cases as well, the NAN 101 can decide to request the proxy processing of the proxy server. This processing can be executed in such case.

In this processing, the proxy server selection control unit 304 first receives a proxy server publish message from a proxy server during the period of DW0 (step S701). At this time, the NAN 101 may prompt a proxy server to transmit a proxy server publish message by spontaneously transmitting a subscribe message indicating that the NAN 101 is searching for proxy servers. Note that the processing in step S701 may be skipped if a list of proxy servers existing nearby is generated by the processing shown in FIG. 5. Alternatively, the processing shown in FIG. 5 may be skipped by executing this processing.

After the end of a general search, the proxy server selection control unit 304 determines whether a plurality of proxy servers have been discovered (step S702). If only one proxy server has been found (NO in step S702), the proxy server selection control unit 304 requests the proxy server to execute the proxy processing (step S704). On the other hand, if a plurality of proxy servers have been discovered (YES in step S702), the proxy server selection control unit 304 requests a proxy server which receives wireless signals during a largest number of DW periods to execute the proxy processing (step S703). The number of DW periods during which each proxy server receives wireless signals is confirmed by the awake DW bitmap included in the received proxy server publish message. In the awake DW bitmap, as described above, a bit corresponding to a DW period during which a wireless signal is received is "1". Therefore, the NAN 101 can decide, as a proxy server of which execution of the proxy processing is to be requested, the transmission source apparatus of the proxy server publish message including the awake DW bitmap whose number of bits of "1" is largest.

Note that an example in which the proxy server publish message is received during the period of DW0 has been explained above. However, the proxy server publish message may be received during a DW period other than DW0. For example, after receiving the proxy server publish messages during all the DW periods of DW0 to DW15, the NAN 101 may decide a proxy server of which the proxy processing is to be requested. Since it is possible to obtain the pieces of information of more proxy servers by receiving the proxy server publish messages during more DW periods, it is possible to increase the probability that the NAN 101 can select a more appropriate proxy server. On the other hand, by receiving the proxy server publish messages during only the period of DW0 and deciding a proxy server for performing the proxy processing, as shown in FIG. 7, the NAN 101 can shorten the period during which it transmits/receives a wireless signal, thereby reducing the power consumption.

If there are a plurality of proxy servers each of which has set "1" in the largest number of bits in the awake DW bitmap, the NAN 101 may decide, in step S703, by another method, an apparatus of which the proxy processing is to be requested. For example, the NAN 101 may select, as a proxy server of which the proxy processing is to be requested, the transmission source apparatus of the proxy server publish message, whose RSSI indicating a reception strength is highest. By requesting the proxy processing of the proxy server having the highest RSSI, it is possible to increase the probability that the NAN 101 can request the proxy processing of a proxy server physically close to itself. Consequently, while the NAN 101 can communicate with the proxy server for performing the proxy processing of itself, it is possible to decrease the probability that a NAN device searching for the NAN 101 exists in a place where communication with the NAN 101 cannot be performed. As a result, it is possible to perform efficient service discovery and notification processes.

The procedure of the operation of the wireless communication system when the NAN 101 requests another communication apparatus to operate as a proxy will be described with reference to FIG. 8. A NAN 103 operating in the non-master sync role transmits a proxy server publish message to each nearby device (step S801). Note that the NAN 101 may transmit a subscribe message for searching for an apparatus operable as a proxy server, and receive a proxy server publish message as a response. Upon receiving the proxy server publish message, the NAN 101 executes the above-described processing related to the reception, and obtains information of DWs during which wireless communication is or is not performed (step S802). Subsequently, NANs 102 and 104 each operating in the master role sequentially transmit proxy server publish messages to each nearby device (steps S803 and S805). The NAN 101 receives the proxy server publish messages, executes the above-described processing related to the reception, and obtains, from the received proxy server publish messages, the pieces of information of DWs during which wireless communication is or is not performed (steps S804 and S806).

After the end of the period of DW0, the NAN 101 performs processing of deciding a target proxy server of which the proxy processing is to be requested (step S807). In this embodiment, the NAN 102 operates in the master role, and remains in the state (awake) in which wireless signals can be received during all the DW periods. On the other hand, the NAN 103 operates in the non-master non-sync role, and is set in the state (awake) in which a wireless signal can be received during the period of DWn where n is a multiple of 4, that is, only the periods of DW0, DW4, DW8, and DW12. Assume that the NAN 104 is in the state (awake) in which a wireless signal can be received during the period of DWn where n is a multiple of 2. Based on the processing shown in FIG. 7, the NAN 101 selects, as a proxy server of which the proxy processing is to be requested, one of the plurality of nearby proxy servers (NANs 102 to 104), which is in the awake state during the largest number of DW periods. That is, in this case, since the NAN 102 is in the awake state during the largest number of DW periods, the NAN 101 selects the NAN 102 as a proxy server (a target of which an operation as a proxy is to be requested) for proxy-transmitting/receiving a signal instead of itself.

The NAN 101 transmits a proxy register request to the NAN 102 as the selected proxy server during the subsequent period of DW1 (step S808). The proxy register request is a message for requesting proxy transmission of service information. Upon receiving the proxy register request, the NAN 102 returns a proxy register response (step S809). After returning the proxy register response, the NAN 102 starts the proxy processing (step S810). If the NAN 102 receives a subscribe message from another apparatus, it proxy-transmits the service information of the NAN 101 contained in the proxy register request. On the other hand, after receiving the proxy register response, the NAN 101 controls to shift to the DOZE state in which no wireless signal is transmitted/received (step S811).

Note that the NAN 101 transmits the proxy register request during the DW period when the proxy server as the request target of the proxy processing is in the awake state. This is because if the proxy register request is transmitted during a DW period when the proxy server as the request target is not in the awake state, the proxy server as the request target cannot receive the proxy register request. In this embodiment, the NAN 102 is in the awake state during all the DW periods. Therefore, the NAN 101 can transmit the proxy register request during the period of DW1 as a DW period immediately after the NAN 102 is selected as the request target of the proxy processing. To the contrary, for example, if the NAN 102 is in the awake state during only the period of DWn where n is a multiple of 2, the NAN 101 transmits the proxy register request during the period of DW2.

If there are a plurality of nearby proxy servers each of which has the highest appearance frequency of the DW periods during which the proxy server is in the awake state, the NAN 101 can request the proxy processing of some or all of the proxy servers. If the NAN 101 requests the proxy processing of the plurality of proxy servers each of which has the highest appearance frequency of the DW periods during which the proxy server is set in the awake state, more efficient service discovery/notification processing may be possible. On the other hand, by suppressing the number of proxy servers as the request targets of the proxy processing, the frequency at which the plurality of proxy servers execute the service discovery/notification processing of the same proxy client is decreased, thereby preventing wireless resources from being wasted.

Note that an example has been described above in which the NAN 101 selects, as a target of which the proxy processing is to be requested, one of the plurality of proxy servers, which is set in the awake state during the DW periods at the highest frequency. The present invention, however, is not limited to this. For example, the NAN 101 may select, as a target of which the proxy processing is to be requested, one of the plurality of proxy servers, which is set in the awake state during the DW periods at a frequency equal to or higher than a predetermined value. That is, the NAN 101 may set the above-described predetermined value to ½, and select, as the request target of the proxy processing, a proxy server which is set in the awake state once or more every two DW periods. In this case, if a plurality of proxy servers are set in the awake state during the DW periods at a frequency equal to or higher than the predetermined value, some or all of the proxy servers can be selected. As a selection criterion for selecting some of the proxy servers which are set in the awake state during the DW periods at a frequency equal to or higher than the predetermined value, the RSSIs may be used, as described above, or other values may be used.

Second Embodiment

In this embodiment, a NAN 101 obtains DW information via not a proxy server publish message but a sync beacon. This processing will be described by mainly focusing attention on the difference from the first embodiment.

Figure 9:
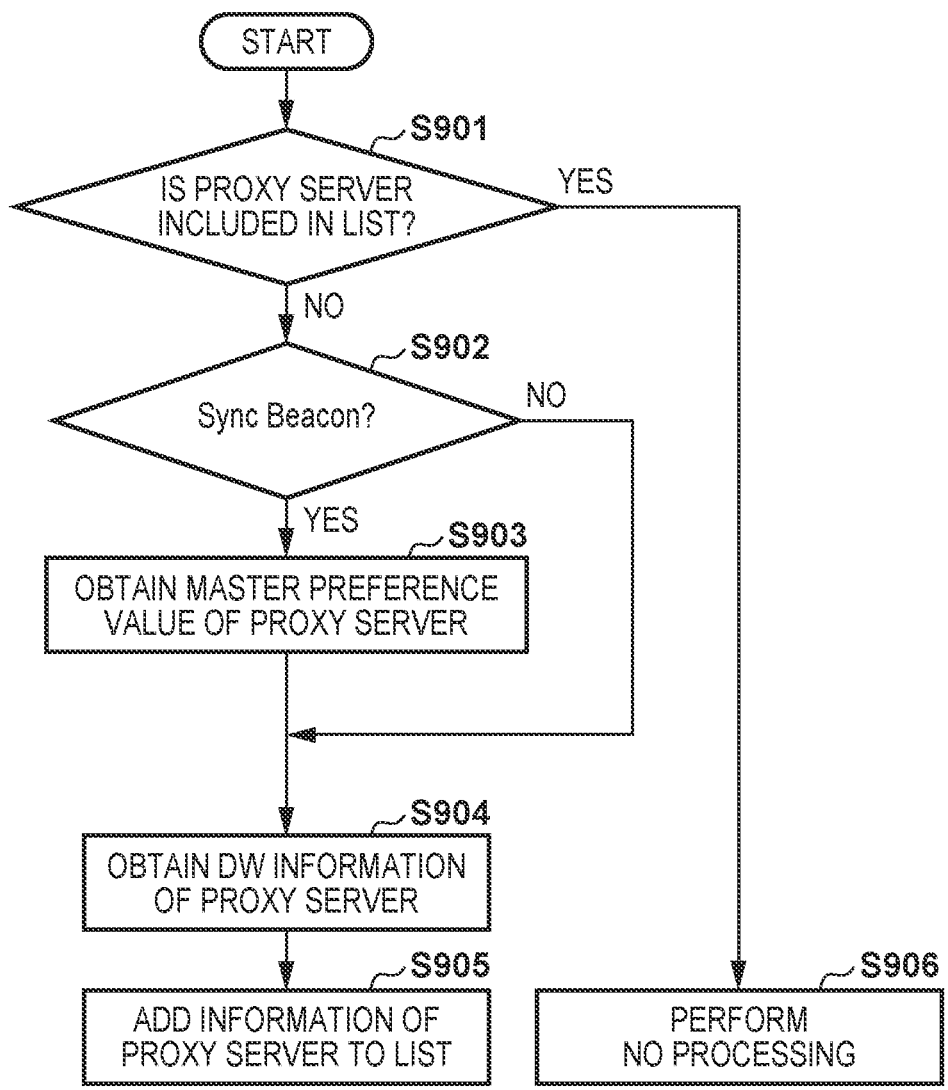
FIG. 9 is a flowchart illustrating the second example of proxy server search processing.

FIG. 9 is a flowchart illustrating an example of the procedure of proxy server search processing. In this processing, sync beacon reception processing is added to the processing shown in FIG. 5. Processes in steps S904 to S906 are the same as those in steps S503 to S505, respectively, and a description thereof will be omitted. Upon receiving a signal from a nearby proxy server, a proxy server search control unit 303 confirms whether the proxy server is included in a list held in the NAN 101 (step S901). If the proxy server as the transmission source of the signal is not included in the list (NO in step S901), the proxy server search control unit 303 determines whether a signal received before step S901 is a sync beacon (step S902). If the received signal is a sync beacon (YES in step S902), the proxy server search control unit 303 obtains a master preference value from the sync beacon (step S903). The master preference value is information which can be used to decide whether to operate in the master role in a cluster.

Figure 10:
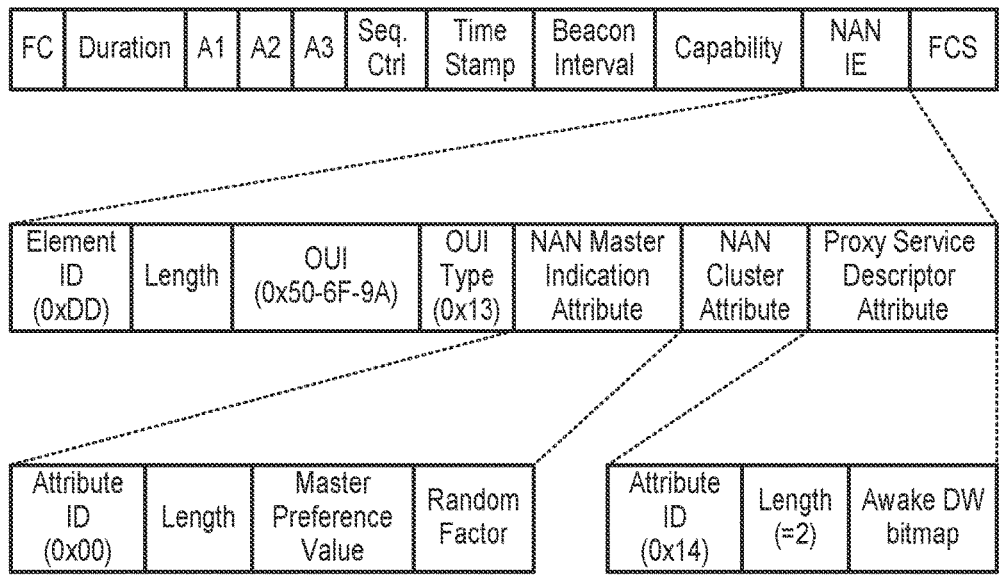
FIG. 10 is a view showing an example of the frame structure of a sync beacon.

The frame structure of the sync beacon transmitted by the proxy server according to this embodiment will be described with reference to FIG. 10. The sync beacon is a predetermined signal complying with the NAN standard, and includes, for example, NAN attributes and extended NAN attributes. The extended NAN attributes include a PSDA, similarly to FIG. 6. That is, the sync beacon includes an awake DW bitmap. As a result, by receiving the sync beacon, the NAN device can know DW periods during which the proxy server as the transmission source of the sync beacon is in a state (awake state) in which wireless signals can be transmitted/received (step S904).

Furthermore, the sync beacon includes a master indication attribute and cluster attribute which must be stored in the sync beacon. The same information elements as the master indication attribute and cluster attribute store NAN attributes. The sync beacon may include a plurality of information elements. The information elements storing the NAN attributes may be divided into a plurality of parts. Note that only attributes which must be stored in the sync beacon are shown in FIG. 10. Other attributes which can be stored may be included.

With the processing shown in FIG. 9, the NAN device (NAN 101) can form a list of pieces of information of proxy servers existing nearby. The list includes information indicating the appearance frequency of DW periods during which each proxy server can transmit/receive wireless signals, and the master preference value of the proxy server.

Figure 11:
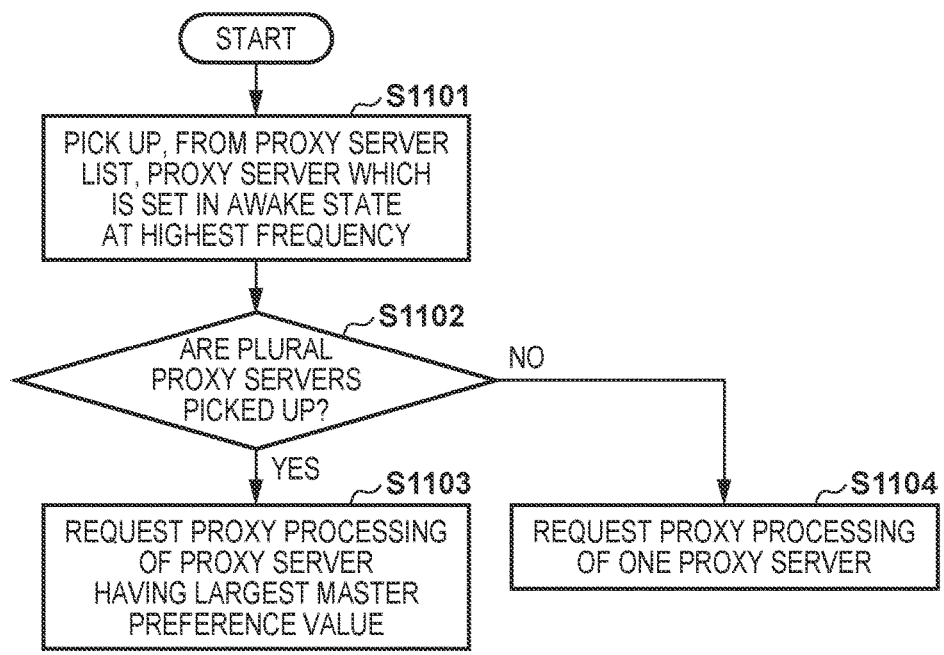
FIG. 11 is a flowchart illustrating the second example of proxy server selection processing.

A proxy server selection control unit 304 of the NAN 101 selects a proxy server for proxy-transmitting/receiving signals instead of itself. This selection processing will be described with reference to FIG. 11. In this processing, the proxy server selection control unit 304 picks up, from the proxy server list obtained by the processing of FIG. 9, a proxy server which is set in the awake state during the DW periods at the highest frequency (step S1101). If only one proxy server is picked up in step S1101 (NO in step S1102), the proxy server selection control unit 304 selects the proxy server as the request target of proxy processing (step S1104).

On the other hand, if a plurality of proxy servers are picked up in step S1101 (YES in step S1102), the proxy server selection control unit 304 refers to the master preference values of the proxy servers. Then, the proxy server selection control unit 304 selects, as the request target of the proxy processing, a proxy server having the largest master preference value (step S1103). The master preference value is a parameter corresponding to the possibility of playing each of the master, non-master sync, and non-master non-sync roles in the NAN cluster. The master preference value is a value indicating the tendency of an apparatus having a larger master preference value to more likely play the master or non-master sync role. That is, in step S1103, the proxy server having the highest tendency to play the master or non-master sync role is selected as the request target of the proxy processing. The NAN 101 can request the proxy processing of the proxy server which tends to play the master or non-master sync role that needs to transmit/receive wireless signals during all the DWs. This allows the NAN 101 to improve the efficiency of service discovery/notification by requesting the proxy processing of the proxy server whose awake period becomes long at high probability.

Figure 8:
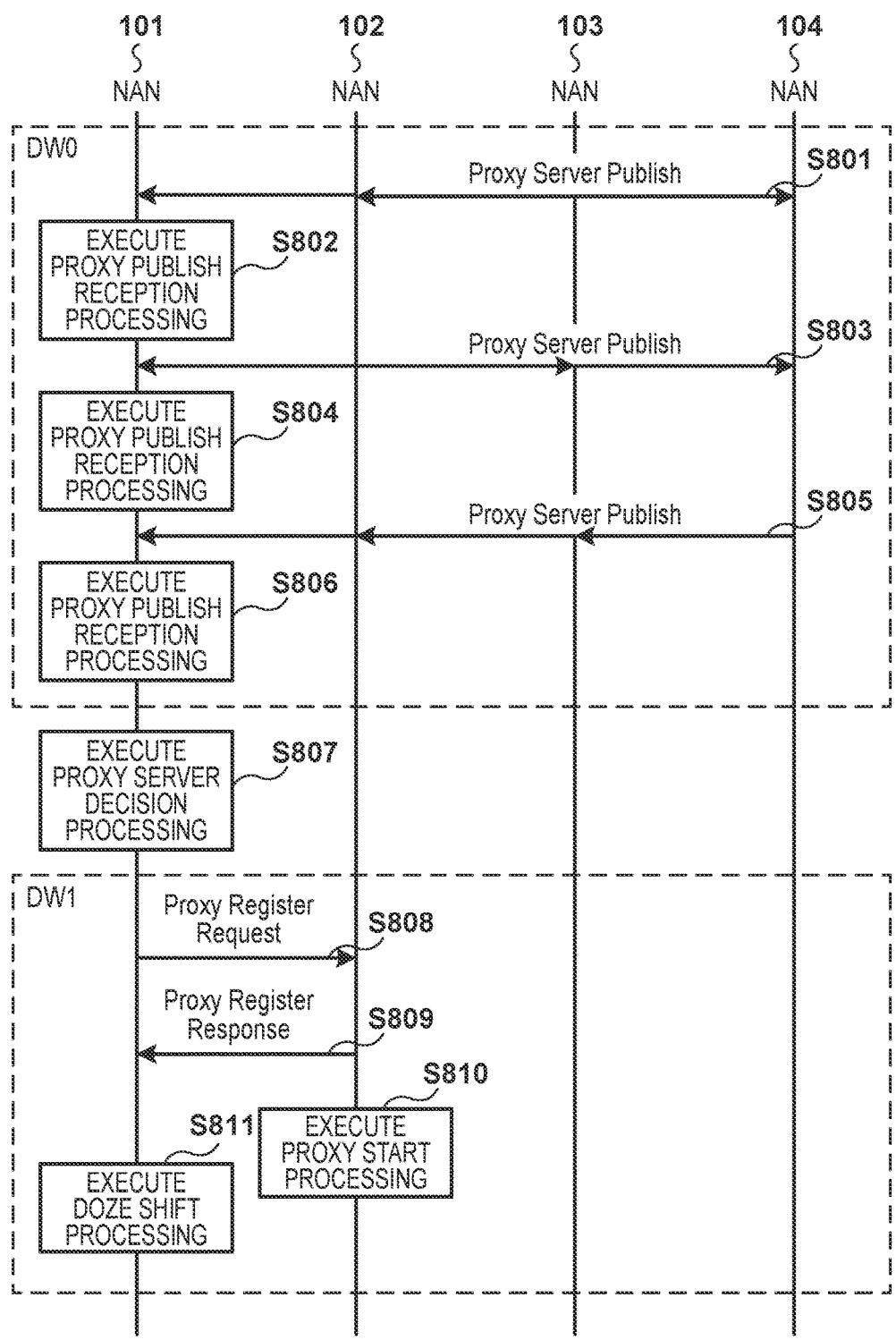
FIG. 8 is a sequence chart showing the first example of the procedure of proxy request processing.
Figure 12:
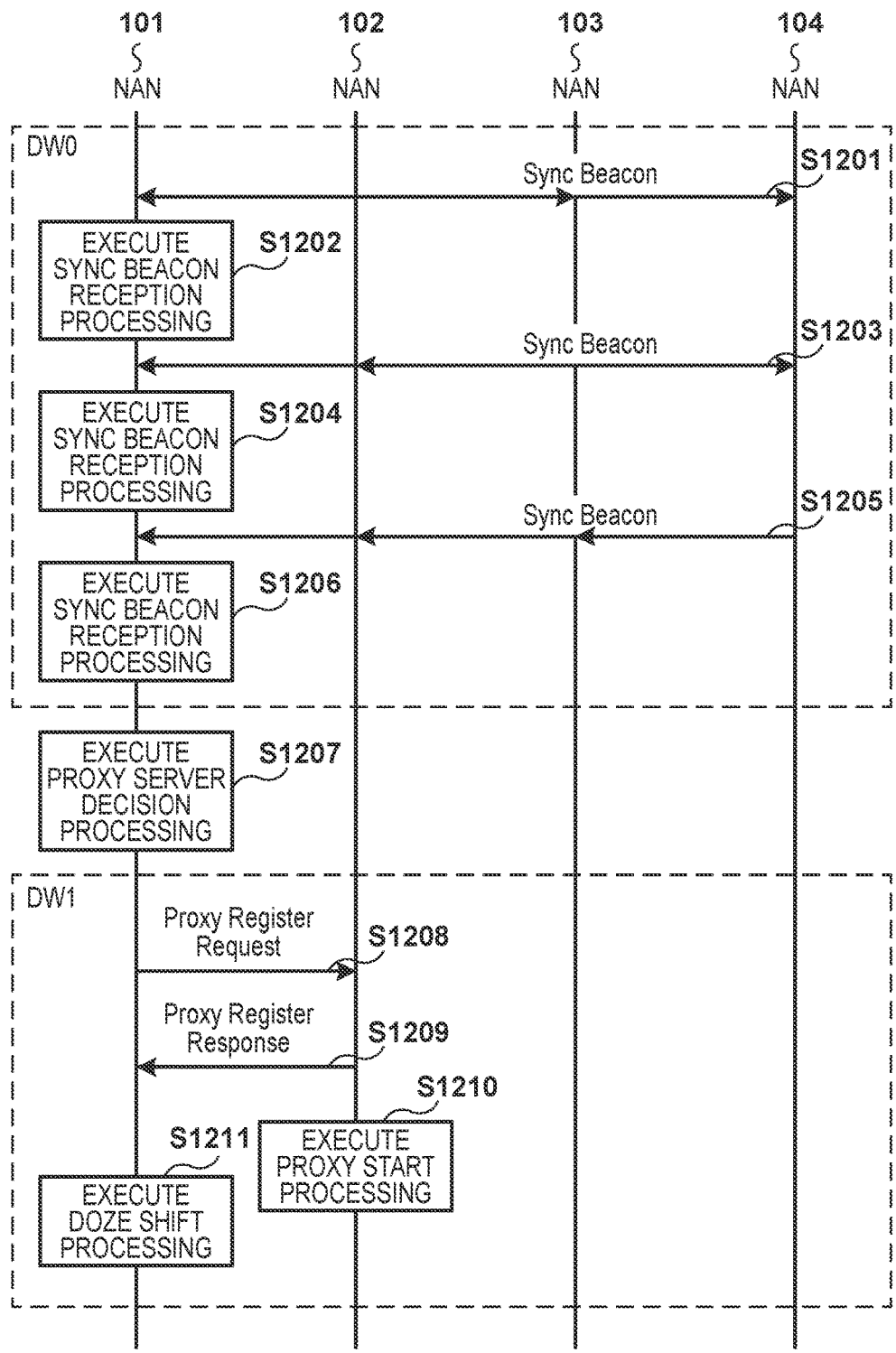
FIG. 12 is a sequence chart showing the second example of the procedure of proxy request processing.

FIG. 12 shows an example of the procedure of the operation of a wireless communication system when the NAN 101 requests another communication apparatus to operate as a proxy, similarly to FIG. 8. In the processing procedure shown in FIG. 12, the proxy server publish messages (steps S801, S803, and S805) in FIG. 8 are changed to sync beacons (steps S1201, S1203, and S1205). Signal reception processes (steps S1202, S1204, and S1206) are also changed in accordance with the changes in transmitted signals. The NAN 101 obtains pieces of DW information from the sync beacons, and selects a proxy server for performing proxy transmission instead of itself (step S1207). Processes (steps S1208 to S1211) after the selection of the proxy server for performing proxy transmission are the same as those in steps S808 to S811.

The device operating in the master or non-master sync role transmits a sync beacon. Although not shown in FIG. 12, the NAN 101 may receive the proxy server publish message of FIG. 8 and the sync beacon at the same time. Thus, the NAN 101 can obtain, from the device operating in the non-master non-sync role, the DW information of the device by the proxy server publish message. The NAN 101 can obtain, from the remaining devices, pieces of DW information (and master preference values) by the proxy server publish messages and sync beacons.

The sync beacons are transmitted to maintain the synchronization in the NAN cluster. Therefore, the device for transmitting the sync beacon is set in the awake state during the DW periods at a high frequency. That is, the DW period during which the DW information can be obtained from the device comes at a high frequency. To the contrary, the device which transmits no sync beacon can transmit a proxy server publish message during a DW period when the device is set in the awake state. Therefore, if a frequency at which the device is set in the awake state is low, the DW period during which the DW information can be obtained from the device comes at a low frequency. By obtaining the pieces of DW information from the sync beacons, the probability that the NAN device can decide, at the early stage, a proxy server of which the proxy processing is to be requested is increased.

The NAN 101 selects a proxy server as the request target of the proxy processing based on not only the frequencies at which the devices are set in the awake state during the DW periods but also the master preference values included in the sync beacons. The proxy server which has a large master preference value and tends to play a role of transmitting a sync beacon, such as the master role, can also transmit/receive signals during the DW periods at high probability. Therefore, in this embodiment, the NAN device selects, as a proxy server for executing the proxy processing instead of itself, a proxy server having a large master preference value. This can increase the probability that the NAN device selects, as a proxy server for executing the proxy processing of itself, a proxy server which is set in the awake state during the DW periods at a high frequency.

Note that an example has been described above in which the NAN 101 selects, as a proxy server for executing the proxy processing of itself, a proxy server having the largest master preference value. The present invention, however, is not limited to this. For example, the NAN 101 may select, as a proxy server for executing the proxy processing of itself, a proxy server having a master preference value equal to or larger than a predetermined value. If a plurality of proxy servers each have the largest master preference value, all or some (for example, one) of the plurality of proxy servers may be selected. If some of the proxy servers are selected, this selection may be made based on, for example, RSSIs or the like, similarly to the first embodiment.

Third Embodiment

In this embodiment, a NAN 101 obtains DW information via not a proxy server publish message but a discovery beacon. The difference from the above-described embodiments will be mainly explained below. The frame structure of the discovery beacon is the same as the structure of the sync beacon shown in FIG. 10. The sync beacon is defined to be transmitted during a DW period. On the other hand, the discovery beacon is intended to send a notification of the existence of a NAN cluster to a device which does not join the NAN cluster, and is thus transmitted during a period other than DW periods. The discovery beacon may be transmitted during a DW period.

Figure 13:
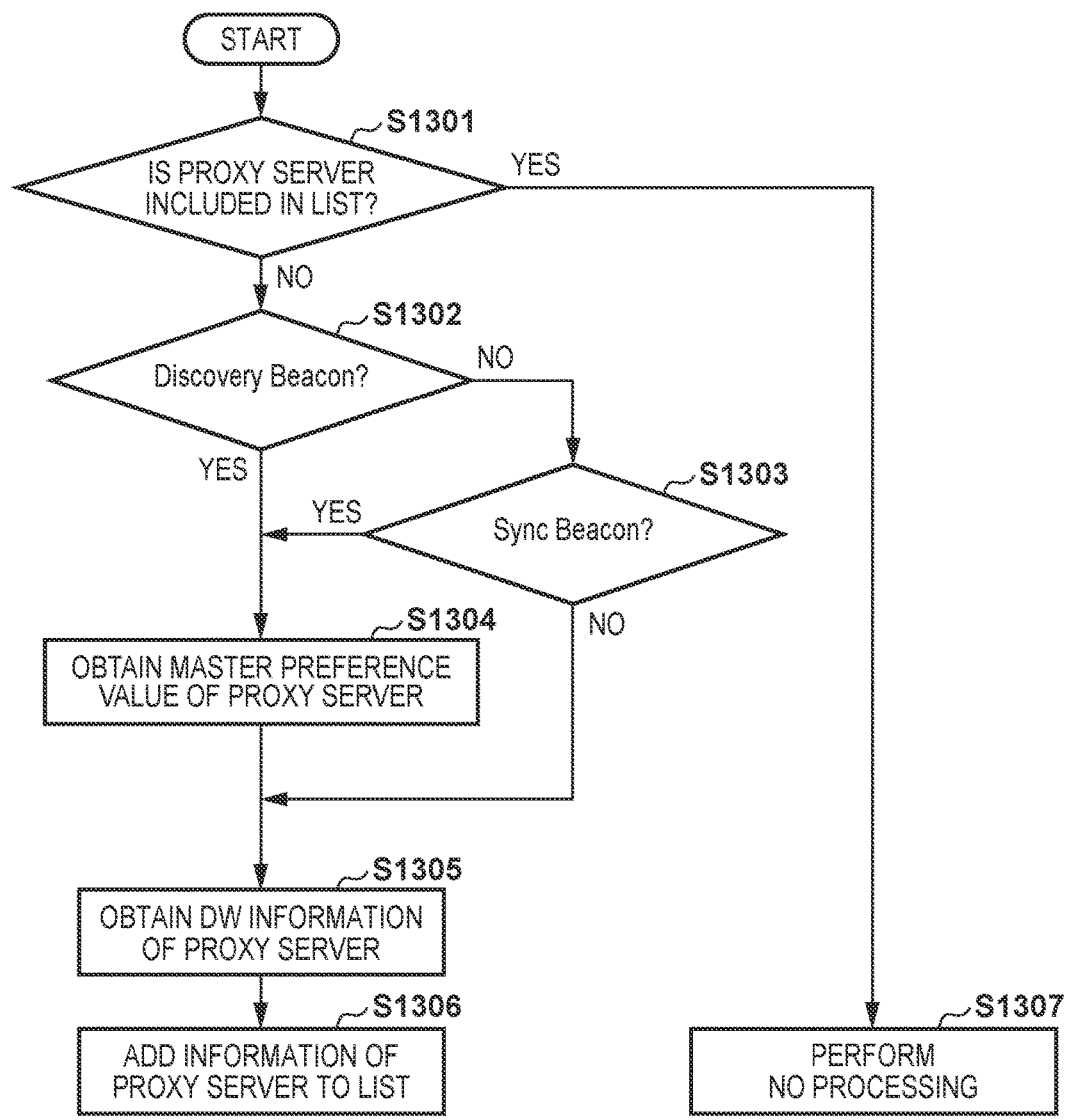
FIG. 13 is a flowchart illustrating the third example of proxy server search processing.

FIG. 13 shows proxy server search processing according to this embodiment. The processing shown in FIG. 13 is the same as that shown in FIG. 9 except that processing (step S1302) of determining whether a received signal is a discovery beacon is included. Step S901 of FIG. 9 corresponds to step S1301 of FIG. 13. Steps S902 to S906 of FIG. 9 correspond to steps S1303 to S1307 of FIG. 13.

Figure 14:
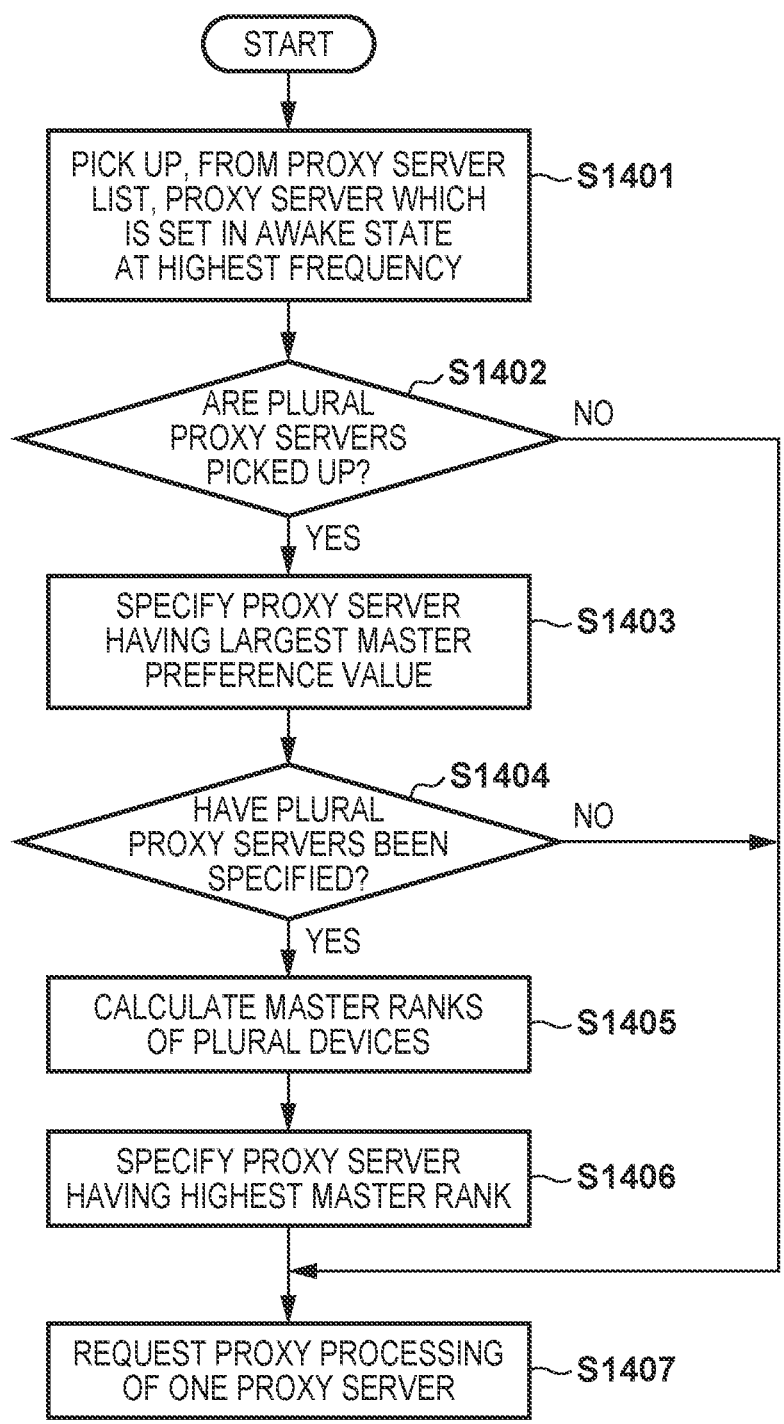
FIG. 14 is a flowchart illustrating the third example of proxy server selection processing.

FIG. 14 shows proxy server selection processing according to this embodiment. In the processing shown in FIG. 14, processes in steps S1401 and S1402 are the same as those in steps S1101 and S1102 of FIG. 11. In this embodiment, processing when proxy servers each of which is set in the awake state during the DW periods at a high frequency are included in a list is different from that shown in FIG. 11. In this embodiment, similarly to step S1103 of FIG. 11, a proxy server having the largest master preference value is specified (step S1403). If only one such proxy server exists (NO in step S1404), the NAN 101 requests proxy processing for itself of the one proxy server (step S1407). On the other hand, if a plurality of such proxy servers exist (YES in step S1404), the NAN 101 calculates master ranks (step S1405). The NAN 101 selects, as a proxy server of which the proxy processing of itself is to be requested, a proxy server having the highest master rank (step S1406). The master rank is calculated using a master preference value, random factor, and NAN address, and is unique to each NAN device included in the NAN cluster at this time. Thus, in step S1406, the NAN 101 can select one proxy server. After that, the NAN 101 requests the one proxy server to execute the proxy processing for the NAN 101 itself (step S1407). With this processing, one proxy server is selected to execute the proxy processing, and thus the power consumption is expected to become low.

The operation of a wireless communication system when the NAN 101 requests another communication apparatus to operate as a proxy will be described with reference to FIG. 15. In this example, as described above, a NAN 103 operates not in the mater role but in the non-master sync role, and thus transmits no discovery beacon. On the other hand, NANs 102 and 104 each operate in the master role, and thus transmit discovery beacons (steps S1501 and S1503). The NAN 101 receives the discovery beacons (steps S1502 and S1504). After that, the NAN 101 obtains pieces of DW information by the discovery beacons, and selects a proxy server for performing proxy transmission for itself based on the pieces of DW information (step S1505). Proxy transmission request processing (steps S1506 to S1509) after the selection of the request target of proxy transmission is the same as that in steps S808 to S811 or steps S1208 to S1211. Note that the proxy transmission request processing in this case need not always be performed during the DW periods.

Figure 15:
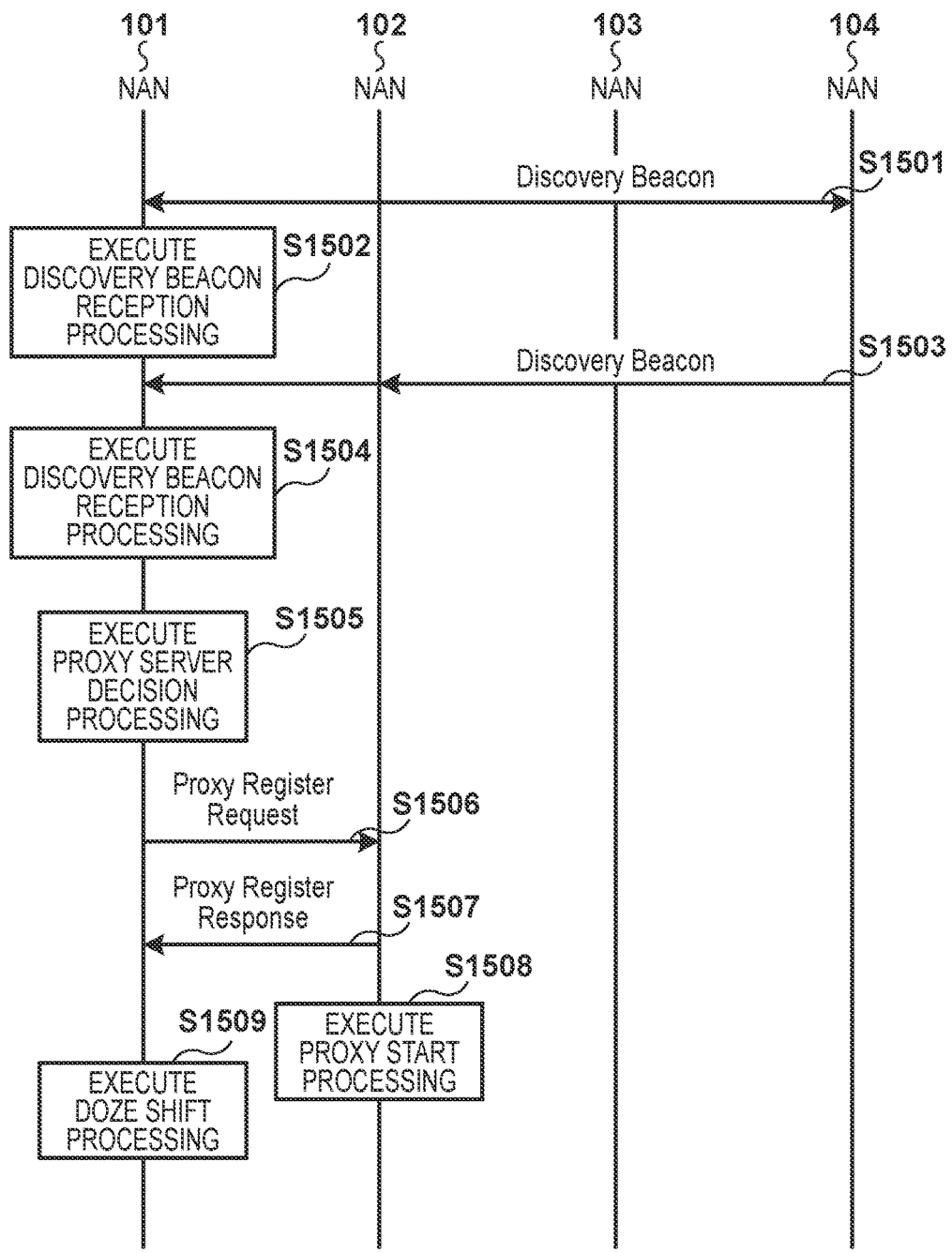
FIG. 15 is a sequence chart showing the third example of the procedure of proxy request processing.

Although not shown in FIG. 15, transmission/reception of the proxy server publish messages of FIG. 8 or the sync beacons of FIG. 12 may be executed at the same time. With this processing, the NAN 101 can obtain DW information by the proxy server publish message from the device operating in the non-master non-sync role. On the other hand, the NAN 101 can obtain pieces of DW information by both the proxy server publish message and the sync beacon from the device operating in the non-master sync role. Furthermore, according to this embodiment, the NAN 101 can obtain DW information by the discovery beacon from the device operating in the master role. The discovery beacon is received before joining the NAN cluster. The device having the master role is expected to be set in the awake state during the DW periods at a high frequency, as described above. The probability that the NAN 101 can efficiently and more quickly discover a device which is set in the awake state during the DW periods at a high frequency is increased.

Fourth Embodiment

The first embodiment has described processing in which the NAN 101 passively stands by for a proxy server publish message transmitted from each proxy server. To the contrary, in this embodiment, a NAN 101 actively inquires about the pieces of information of proxy servers.

Figure 16:
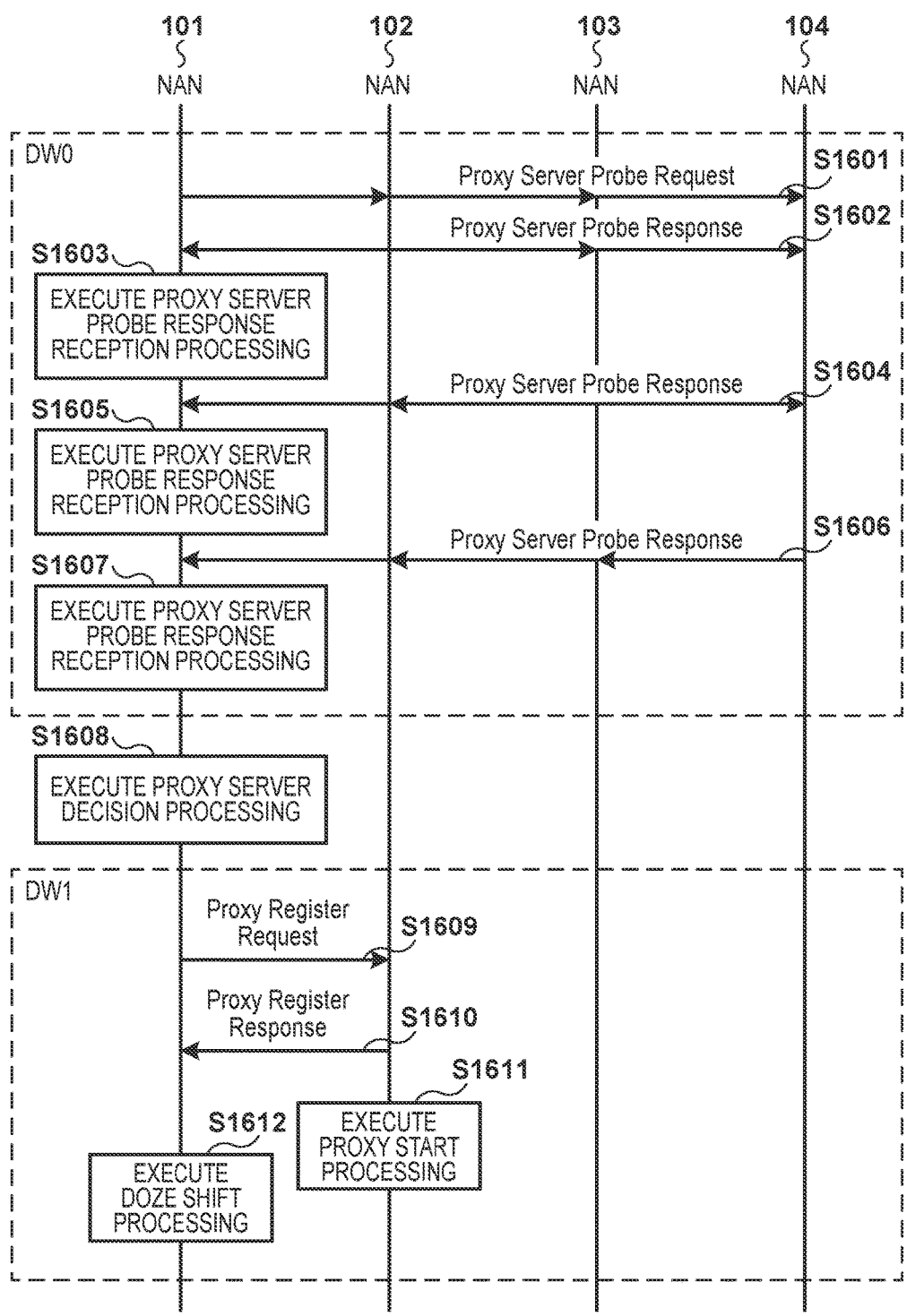
FIG. 16 is a sequence chart showing the fourth example of the procedure of proxy request processing.

Processing in which the NAN 101 actively inquires of proxy servers will be described with reference to FIG. 16. Note that the difference from the above-described embodiments will be mainly explained. The NAN 101 transmits a proxy server probe request (step S1601). In response to this, NANs 102 to 104 respectively return proxy server probe responses (steps S1602, S1604, and S1606). Each proxy server probe response as a response message can have the same structure as that of the proxy server publish message shown in FIG. 6. Note that in the second and third embodiments, the NAN 101 may receive a proxy server publish message as a response signal to a subscribe message. After that, the NAN 101 receives the proxy server probe responses (steps S1603, S1605, and S1607), obtains pieces of DW information, and selects, based on the pieces of DW information, a proxy server for performing proxy transmission (step S1608). Proxy transmission request processing (steps S1609 to S1612) after the selection of the request target of proxy transmission is the same as that in steps S808 to S811, steps S1208 to S1211, or steps S1506 to S1509.

Fifth Embodiment

Each of the above-described embodiments has described an example in which each proxy server stores DW information in the frame of one of the proxy server publish message, sync beacon, and discovery beacon, and transmits it. In this case, based on the pieces of DW information obtained from the received signals, the NAN 101 selects a proxy server for executing the proxy processing for itself. In this embodiment, instead of obtaining pieces of DW information stored in received signals, a NAN 101 counts the number of operations of receiving signals from proxy servers during a period from DW0 to DW15. Based on the count, the NAN 101 determines a frequency at which each proxy server is set in the awake state during the DW periods. This processing can be executed instead of the processes of FIGS. 5, 9, and 13.

Figure 17:
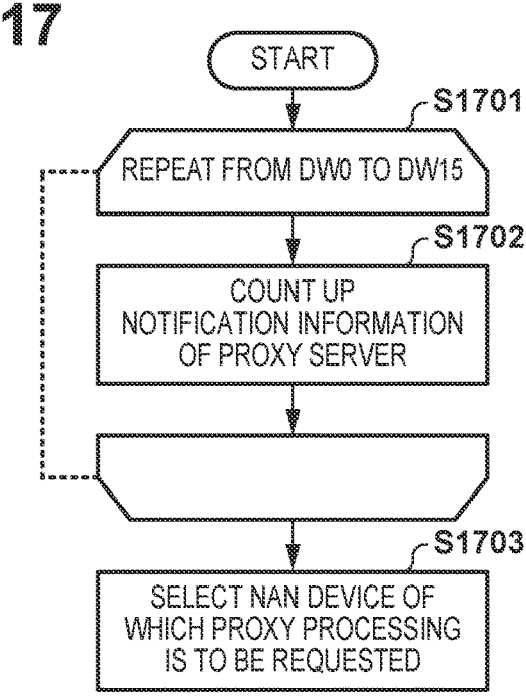
FIG. 17 is a flowchart illustrating the fourth example of proxy server search processing.

The procedure of this processing will be described with reference to FIGS. 17 and 18. Since each of NANs 102 to 104 serves as a proxy server, it transmits a proxy server publish message and a sync beacon during the DW period. Each of the NANs 102 and 104 operates in the master role, and thus additionally transmits a discovery beacon. The NAN 101 counts the reception frequency of the proxy server publish messages or sync beacons from the proxy servers during a period from DW0 to DW15 (for example, one cycle) (steps S1701 and S1702). Note that even if the NAN 101 receives discovery beacons during the DW period, a frequency at which each proxy server is set in the awake state during the DW periods is determined, similarly to a case in which the proxy server publish messages or sync beacons are received.

Figure 18:
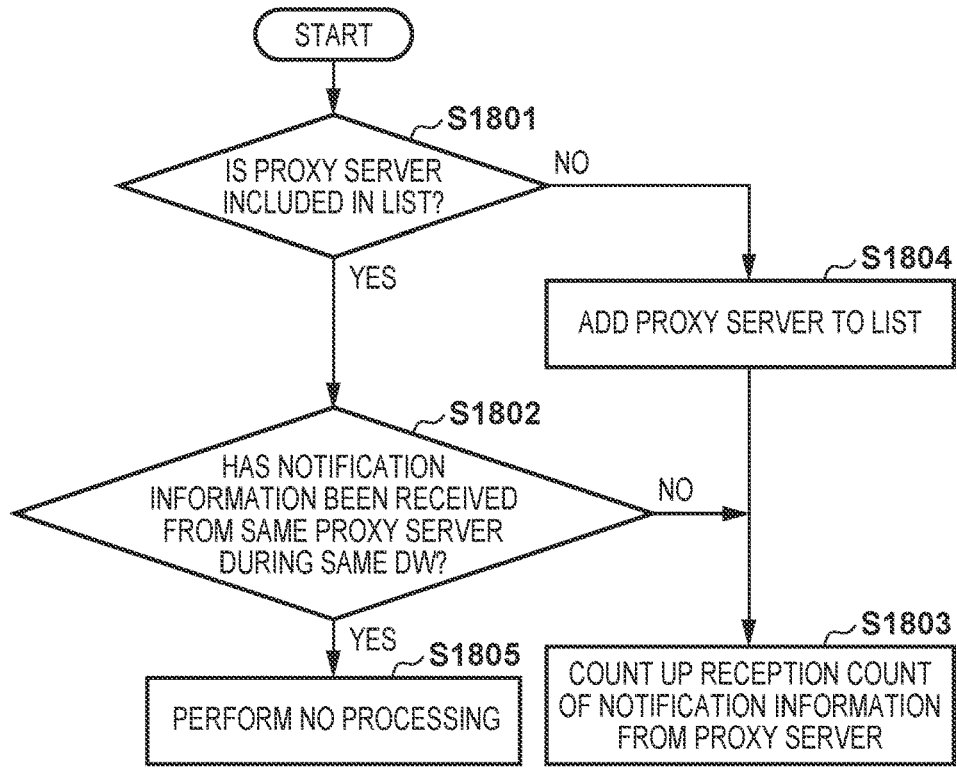
FIG. 18 is a flowchart illustrating, in detail, part of the fourth example of the proxy server search processing.

FIG. 18 shows the detailed processing procedure of the processing in step S1702. The NAN 101 determines whether a proxy server as the transmission source of received notification information (including one of the proxy server publish message, sync beacon, and discovery beacon) is included in a list (step S1801). The list includes the information of a proxy server as the transmission source of notification information when the NAN 101 receives the notification information. If the information of the proxy server as the transmission source of the notification information is included in the list (YES in step S1801), the NAN 101 determines whether other notification information has been received from the proxy server during the DW period when the notification information is received (step S1802). For example, if the NAN 101 receives a proxy server publish message after receiving a sync beacon from the NAN 102 during one predetermined DW period, YES is determined in step S1802. In this case, it is important that the NAN 102 is set in the awake state during the DW period and it is not important that the two signals are received. Therefore, even if the NAN 101 receives a plurality of signals during the same DW period (YES in step S1802), it counts up the reception count by one, and performs no processing at the time of reception of the second and subsequent signals (step S1805). On the other hand, if the NAN 101 receives notification information during the same DW period for the first time (NO in step S1802), it counts up the signal reception count as the number of times the proxy server is set in the awake state during the DW periods (step S1803). If the NAN 101 determines in step S1801 that the proxy server as the transmission source of the notification information is not included in the list (NO in step S1801), it newly registers the proxy server in the list (step S1804). The NAN 101 counts up the signal reception count as the number of times the proxy server is set in the awake state during the DW periods (step S1803). By counting up the signal reception count, the NAN 101 can specify a frequency at which each proxy server is set in the awake state during the DW periods. Based on the specified frequency, the NAN 101 selects a proxy server of which the proxy processing for itself is to be requested, similarly to the above-described embodiments (step S1703).

As described above, the NAN device can determine a frequency at which each nearby proxy server is set in the awake state during the DW period, and request proxy processing of a proxy server having a high frequency. Thus, the probability that the proxy server of which the NAN 101 has requested the proxy processing can execute the proxy processing during the DW period becomes high, thereby making it possible to shorten the time taken to perform service search/discovery processing.

Each of the above-described embodiments has described an example in which the NAN 101 obtains information of DW periods during which each nearby proxy server transmits/receives wireless signals, and selects, based on the information, a proxy server of which the proxy processing is to be requested. The present invention, however, is not limited to this. For example, based on only master preference values, the NAN 101 may select a proxy server of which the proxy processing is to be requested. Since the master role needs to be in the awake state during all the DW periods, the probability that a proxy server which tends to play the master role can execute the proxy processing during all the DW periods is increased. When, therefore, the NAN 101 requests the proxy processing of such proxy server, the probability that the proxy server can execute the proxy processing during the DW periods is increased.

In addition, each proxy server may notify the proxy client of a DOZE state period or an awake state period which is not limited to the DW periods, and the proxy client may select a proxy server which is in the awake state for a long time. After requesting the proxy processing of the proxy server, the proxy client may periodically search for other proxy servers in the NAN cluster, and reselect a proxy server.

Furthermore, if there is no proxy server which is in the awake state during a DW period equal to or longer than a given period, the NAN device may not request the proxy processing. For example, if there is no proxy server which is in the awake state during all the DW periods, the NAN 101 need not request the proxy processing of any proxy server in step S703 of FIG. 7. In this case, the NAN 101 can execute service search/discovery processing by sending a notification of a service or discovering a service as usual without requesting the proxy processing.

According to the present invention, it is possible to shorten the period until a communication apparatus discovers another apparatus and a service provided by it.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187447, filed Sep. 24, 2015 which is hereby incorporated by reference herein in its entirety.

What is claimed is:

1. A communication apparatus comprising:
one or more processors; and
at least one memory including instructions stored thereon which, when executed by the one or more processors, cause the communication apparatus to:
search for other communication apparatuses each of which can execute, as a proxy of the communication apparatus, at least one of transmission processing and reception processing of a wireless signal during a period of a predetermined length which comes at a predetermined time interval;
obtain information indicating an appearance frequency of periods during which each communication apparatus among the other communication apparatuses detected by the search can transmit/receive the wireless signals; and
select, from the other communication apparatuses detected by the search, an apparatus for executing the processing as the proxy of the communication apparatus based on the obtained information.

2. The communication apparatus according to claim 1, wherein in obtaining the information, the instructions, when executed by the one or more processors, cause the communication apparatus to:
obtain the information indicating the appearance frequency from information of the periods, during which each of the other communication apparatuses can transmit/receive the wireless signals, contained in a predetermined signal received from each of the other communication apparatuses.

3. The communication apparatus according to claim 1, wherein in obtaining the information, the instructions, when executed by the one or more processors, cause the communication apparatus to:
obtain the information indicating the appearance frequency based on a number of times a predetermined signal is received from each of the other communication apparatuses during the periods.

4. The communication apparatus according to claim 1, wherein in selecting the apparatus, the instructions, when executed by the one or more processors, cause the communication apparatus to:
select the apparatus for executing the processing as the proxy of the communication apparatus from one of a set of the other communication apparatuses each of which has the highest appearance frequency or a set of the other communication apparatuses each of which has the appearance frequency not lower than a predetermined value.

5. The communication apparatus according to claim 4, wherein in selecting the apparatus, the instructions, when executed by the one or more processors, cause the communication apparatus to:

if there is one of the set of the plurality of other communication apparatuses each of which has the highest appearance frequency or the set of the plurality of other communication apparatuses each of which has the appearance frequency not lower than the predetermined value, select, based on reception strengths of signals from the plurality of other communication apparatuses, the apparatus for executing the processing as the proxy of the communication apparatus.

6. The communication apparatus according to claim 1, wherein the instructions, when executed by the one or more processors, further cause the communication apparatus to:

obtain, from each of the other communication apparatuses, a value indicating a possibility that each of the other communication apparatuses serves as an apparatus for transmitting beacons during the periods, wherein in selecting the apparatus, the instructions, when executed by the one or more processors, cause the communication apparatus to select, based on the information indicating the appearance frequencies and the values, the apparatus for executing the processing as the proxy of the communication apparatus from the other communication apparatuses.

7. The communication apparatus according to claim 6, wherein as the value is larger, the other communication apparatus more likely serves as an apparatus for transmitting the beacons during the periods, and in selecting the apparatus, the instructions, when executed by the one or more processors, cause the communication apparatus to select the apparatus for executing the processing as the proxy of the communication apparatus from one of a set of the other communication apparatuses each of which has a largest value or a set of the other communication apparatuses each of which has the value not smaller than a predetermined value.

8. The communication apparatus according to claim 1, wherein the period comprises a period of a discovery window of Wi-Fi Alliance Neighbor Awareness Networking.

9. A communication apparatus comprising:
service information;
one or more processors; and
at least one memory including instructions stored thereon which, when executed by the one or more processors, cause the communication apparatus to:
detect at least one other communication apparatus which can proxy-transmit service information during discovery windows of Neighbor Awareness Networking; and
determine, in accordance with a frequency at which the at least one other communication apparatus is set in a state of performing no wireless communication during the discovery windows, whether to request the at least one other communication apparatus to proxy-transmit the service information of the communication apparatus.

10. The communication apparatus according to claim 9, wherein in detecting the at least one other communicating apparatus, the instructions, when executed by the one or more processors, cause the communication apparatus to:

if a plurality of other communication apparatuses are detected, determine to request one of the plurality of other communication apparatuses, which is set in the state of performing no wireless communication during the discovery windows at a low frequency, to proxy-transmit the service information of the communication apparatus.

11. The communication apparatus according to claim 9, wherein in detecting the at least one other communicating apparatus, the instructions, when executed by the one or more processors, cause the communication apparatus to:

in accordance with the frequency, indicated in information contained in one of a beacon or a service discovery frame, at which the state of performing no wireless communication during the discovery windows is set, determine whether to request the at least one other communication apparatus to proxy-transmit the service information of the communication apparatus.

12. A control method for a communication apparatus, comprising:

searching for other communication apparatuses each of which can execute, as a proxy of the communication apparatus, at least one of transmission processing or reception processing of a wireless signal during a period of a predetermined length which comes at a predetermined time interval;

obtaining information indicating an appearance frequency of periods during which each communication apparatus among the other communication apparatuses detected by the searching can transmit/receive the wireless signal; and selecting, from the other communication apparatuses detected by the searching, an apparatus for executing the processing as the proxy of the communication apparatus based on the obtained information.

13. A non-transitory computer-readable storage medium storing a computer program for causing a computer comprised in a communication apparatus to:

search for other communication apparatuses each of which can execute, as a proxy of the communication apparatus, at least one of transmission processing or reception processing of a wireless signal during a period of a predetermined length which comes at a predetermined time interval;

obtain information indicating an appearance frequency of periods during which each communication apparatus among the other communication apparatuses detected by the search can transmit/receive the wireless signal; and select, from the other communication apparatuses detected by the search, an apparatus for executing the processing as the proxy of the communication apparatus based on the obtained information.

* * * * *